US 12,116,158 B2

United States Patent
Galucki et al.

(10) Patent No.: US 12,116,158 B2
(45) Date of Patent: Oct. 15, 2024

(54) CANNING DEVICE

(71) Applicant: Rubbermaid Incorporated, Atlanta, GA (US)

(72) Inventors: Stephen Galucki, Huntersville, NC (US); Earle Cramer, Portage, MI (US); Rebecca Wiener, Portage, MI (US); John Levandowski, Saint Joseph, MI (US); Taegan Williams, Charlotte, NC (US)

(73) Assignee: Rubbermaid Incorporated, Atlanta, GA (US)

( * ) Notice: Subject to any disclaimer, the term of this patent is extended or adjusted under 35 U.S.C. 154(b) by 0 days.

(21) Appl. No.: 18/186,486

(22) Filed: Mar. 20, 2023

(65) Prior Publication Data

US 2023/0294864 A1 Sep. 21, 2023

Related U.S. Application Data

(60) Provisional application No. 63/321,275, filed on Mar. 18, 2022.

(51) Int. Cl.
| | |
|---|---|
| *A47J 27/08* | (2006.01) |
| *A47J 27/086* | (2006.01) |
| *B65B 55/10* | (2006.01) |
| *A23L 3/00* | (2006.01) |
| *A23L 3/015* | (2006.01) |
| *A23L 3/10* | (2006.01) |

(52) U.S. Cl.
CPC .............. *B65B 55/10* (2013.01); *A47J 27/08* (2013.01); *A47J 27/0802* (2013.01); *A47J 27/086* (2013.01); *A23L 3/003* (2013.01); *A23L 3/015* (2013.01); *A23L 3/10* (2013.01)

(58) Field of Classification Search
USPC ........................................................ 53/111 R
See application file for complete search history.

(56) References Cited

U.S. PATENT DOCUMENTS

| | | | |
|---|---|---|---|
| 2016/0007644 A1* | 1/2016 | Hack ...................... | A23L 3/003 99/333 |
| 2016/0198883 A1* | 7/2016 | Wang ....................... | A23L 5/10 426/231 |
| 2022/0167788 A1* | 6/2022 | Oh ........................... | A47J 36/321 |

FOREIGN PATENT DOCUMENTS

WO  WO-2016077284 A1 *  5/2016  ............. A47J 27/12

* cited by examiner

*Primary Examiner* — Chinyere J Rushing-Tucker
(74) *Attorney, Agent, or Firm* — Husch Blackwell LLP

(57) ABSTRACT

An electric water-bath canning device comprising a pot and a base is provided. The pot includes a body with a spout such that water can easily be removed from the pot by the user. The base includes an aperture configured to receive the spout when the pot is set upon the base. A heating element is affixed to a bottom portion of the pot and can supply heat energy to a water bath inside the pot to facilitate the canning process. A display is provided with the base, the display having at least one input device and at least one output device. The user may select various manual and automatic modes of operation via the at least one input device to control the canning process. The at least one output device may provide the user with information related to the canning process.

20 Claims, 4 Drawing Sheets

CANNING DEVICE

CROSS-REFERENCE TO RELATED APPLICATIONS

This application claims priority to U.S. Provisional Patent Application Ser. No. 63/321,275, filed on Mar. 18, 2022, entitled "CANNING DEVICE," the entire disclosure of which is incorporated herein by reference.

FIELD OF INVENTION

The present invention relates generally to an electric canning device and more specifically to a water-bath canning device that automatically adjusts parameters of the canning process based on user inputs.

BACKGROUND OF INVENTION

Worldwide, consumers cultivate fruit and vegetable gardens to provide themselves with a fresh source of produce. Because an entire crop of produce may need to be harvested over a short time, many consumers end up with more produce than they can use or consume before the produce rots. Canning provides consumers a process by which they may preserve harvested produce in a shelf-stable form that is safe to eat months or even years after the produce is harvested.

Unfortunately, the canning process (including the traditional water-bath canning method) is labor intensive and requires consumers to monitor the processing temperature and time carefully. To start the canning process, the consumers must prepare a hot water bath using a pot on a kitchen stovetop. Then, the consumers must warm the jars in the hot water bath. Next, the consumers must carefully remove the warmed jars from the water bath, load the jars with prepared food, and then return the jars to the water bath. In the water bath, the produce must be heated to a high temperature for enough time to ensure that substantially all of the microorganisms in the produce are destroyed. If the microorganisms are not destroyed, the produce could rot, or the microorganisms could produce toxins while the canned produce is in storage. Finally, in the last stage of the canning process, the jar is sealed to prevent bacteria or other microorganisms from permeating into the jar, which also helps prevent spoilage.

In the process outlined above, consumers must manually control the amount of heat applied to the water bath during the canning process and must monitor the canning time themselves. If the consumers miscalculate either of these variables, the quality of the produce stored within the jar may decrease and/or the produce will spoil during storage. Some manufacturers have developed electric water baths that purport to make the canning process easier, but these devices require the consumers to manually adjust the heat applied to the water and to manually monitor the canning time.

SUMMARY OF INVENTION

The present invention overcomes many of the shortcomings and limitations of the prior art devices discussed above. The invention described includes several embodiments of an electric, water-bath canning device (the "canning device") that has a broader range of functionality than prior art canning devices. The canning device may include an interface (e.g., a digital touchpad) that allows users to "set-it and forget-it" during the canning process. To do so, the user may select from various automatic canning options programmed into a memory of the canning device. As an example, a program may cause the canning device to automatically heat a water bath to a predetermined temperature for a predetermined amount of time to carry out the canning process without user intervention. Further, once processing of a jar is complete, the canning device may automatically turn off, allowing the canning device and the jars within it to cool so that these objects can more safely be handled by the users.

The canning device may include at least one sensor that can detect various parameters related to the canning process (e.g., a water bath temperature and/or the altitude at which the canning device is located). Using information obtained from the at least one sensor, the canning device may adjust its pre-programmed automatic canning options to help ensure that the appropriate amount of heat is applied to the water bath during the canning process. Finally, the electric canning device may include one or more output devices (e.g., a light indicator, a display, and/or a speaker) that signals the user when the canning process or a step of the canning process is complete.

The canning device may also be provided in a form that helps make the device easier for the consumer to use. The canning device may include a pot that may be coupled to a base. The base may include many of the electronic components of the canning device and may provide additional stability for the pot during use. The pot may include a spigot in fluid communication with an interior of the pot such that the user may drain water from the pot without pouring water out of the pot's top opening. The base may include at least one aperture positioned and shaped such that the spigot can be received through the least one aperture, which may allow the user to position the pot on the base in a variety of configurations. Further, the canning device may include additional implements (e.g., detachable racks) that may allow the canning device to be used as a steamer, slow-cooker, rice cooker, and the like.

These and other aspects and advantages of the present invention will become apparent to those skilled in the art after considering the following detailed description in connection with the accompanying drawings.

Figure 1:
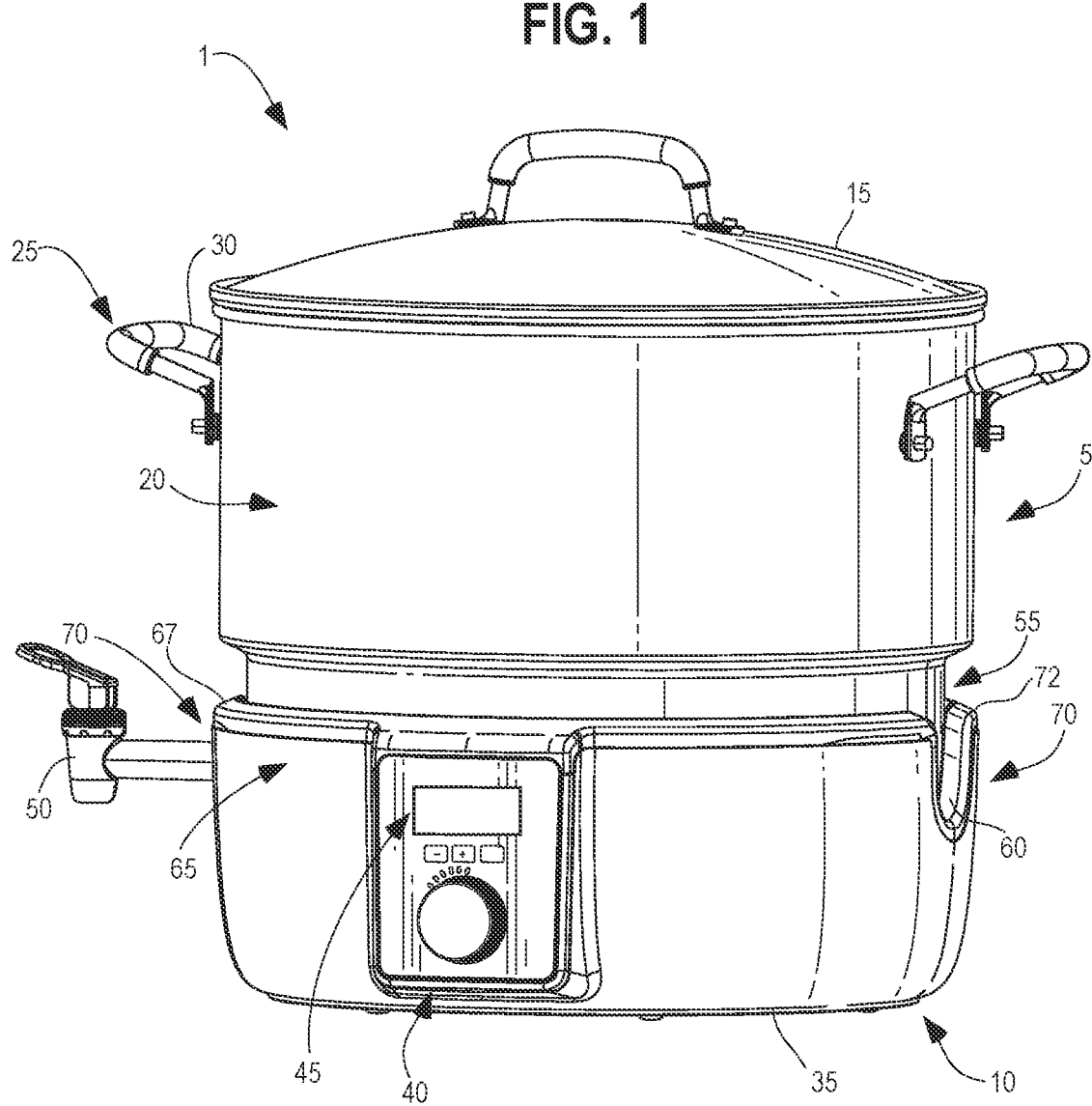
FIG. 1 is a perspective view of an electric canning device, the canning device including a pot and a base.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. Although the invention described below may have several different functions, including steaming, cooking, and canning food, all of these processes together are generically referred to as "canning," "processing," and a "canning process" throughout the specification.

FIG. 1 illustrates a canning device 1 including a pot 5 and a base 10. The canning device 1 may allow a user to "can" and/or process food (e.g., vegetables and fruits with a pH of less than 4.6) for long term storage. To use the canning device 1, the user may couple the pot 5 to the base 10 before or after water (not illustrated) has been placed and secured within the pot 5. Once jars (not illustrated) are loaded into the pot 5, the user may place a lid 15 over the pot 5 to help seal an interior of the pot 5 from the outside environment. This may help increase the rate at which the water bath temperature increases, which may speed up the canning process. The canning device 1 may be connected to an external energy source (e.g., through an electrical cord, not illustrated) that is coupled to the base 10. The external energy source may allow the canning device 1 to heat the pot 5 (and the contents of the pot 5) to carry out the canning process.

A body 20 of the pot 5 may be constructed of a durable, heat-conductive material such as stainless steel and/or aluminum. The body 20 may be provided as a hollow cylinder that is open at one end, although other shapes for the body 20 (and thus the pot 5) are foreseeable. The conductivity of the body 20 may allow heat applied to an outside surface of the pot to be transferred to the contents contained within the interior of the pot 5. In addition, U-shaped handles 25 may be coupled or affixed to the body 20, although other forms for the handles 25 are foreseeable. The handles 25 may assist the user in moving the pot 5 onto and off the base 10 by providing a convenient location for the user to grip the pot 5. The handles 25 may also include heat-resistant grips 30 (e.g., grips constructed out of a thermally non-conductive material) to help the user safely lift the pot 5 after heat has been applied to the pot 5.

The base 10 may be constructed of a lightweight, durable material such as a polymer or plastic. The base 10 may be formed such that its profile is substantially similar to the overall shape of the pot 5. Thus, in the illustrated embodiment, the base 10 is provided in the form of a hollow cylinder with an open top. However, as would be appreciated by those skilled in the art, the base 10 may be provided in other shapes that may allow the base 10 to support and couple to the pot 5 during the canning process. The base 10 may also include a bottom surface 35 that is equipped with a non-slip material (e.g., rubber, not illustrated) to help prevent the movement of the canning device 1 as it is used.

To activate or otherwise control operation of the canning device 1, the user may interact with an interface 40 provided on the base 10. The interface 40 may include various input devices including, but not limited to, physical buttons, switches, capacitive touchpads, knobs, or any combination thereof. The interface 40 may allow the user to control various parameters associated with the canning process, such as the amount of heat applied to the pot 5 and the length of time heat is applied to the pot 5. In addition, via the interface 40, the user may select various automatic canning options that are programmed into a memory (not illustrated) of the canning device 1. The automatic canning options may execute the canning process automatically and without user intervention.

The interface 40 may include a display 45 to allow the canning device 1 to output information that the user can view and interpret. For example, the display 45 can communicate the amount of time remaining in the canning process, the amount of heat being applied to the pot 5, the number of jars inserted into the pot 5, the food loaded into the pot 5, and the like. In some embodiments of the invention, the display 45 may be provided as a touchscreen display such that the display 45 may also function as an input device.

In some embodiments, the canning device 1 may include at least one sensor that can detect various parameters associated with the canning process. The at least one sensor may be provided as an altitude sensor, a temperature sensor, a pressure sensor, a water-flow sensor, a density meter, a timer, and other similar sensors known in the art. For example, a temperature sensor may be provided with the pot 5 (see FIG. 3) that can measure the temperature of the water bath and/or a surface of the pot 5. As an additional example, the canning device 1 may include an altitude sensor (not illustrated) that detects, via known mechanisms, the altitude of the canning device 1. The canning device 1 may use the altitude information to adjust the automatic canning processes. For example, if the altitude sensor detects that the canning device 1 is being utilized at a high altitude location, the canning device 1 may change a target water bath temperature for the canning process (e.g., by lowering the target water bath temperature). Furthermore, the data from the altitude sensor may be provided to a controller that adjusts the target water bath temperature for the canning process. The altitude sensor may be a standalone component included in the canning device 1, or the altitude sensor may be integrated into another component of the canning device 1, such as a printed circuit board.

After the canning process is complete, the user may desire to remove the water from the pot 5. Advantageously, the pot 5 may include a spout 50 in fluid communication with the interior of the pot 5. The spout 50 may be positioned and located on a bottom portion 55 of the pot 5 such that most or substantially all the water in the pot 5 may be drained from the pot 5 via the spout 50. Further, the spout 50 may extend outwardly and longitudinally away from the body 20 of the pot 5. The spout 50 may be placed in a closed position, in which water does not flow out of the interior of the pot 5, or the spout 50 may be placed into an open position, in which water can be drained from the pot 5. Draining water from the pot 5 reduces the weight of the pot 5, which may help the user more easily remove the pot 5 from the base 10 after the canning device 1 is used.

The base 10 may be configured to accommodate the spout 50 via at least one aperture 60. The at least one aperture 60 may be positioned and located on a top portion 65 of the base 10. The at least one aperture 60 may extend longitudinally and at least partially vertically through a sidewall or sidewalls 67 of the top portion 65 of the base 10. In the illustrated embodiment, the base 10 includes two apertures 60 that are positioned and located on opposite sides 70 of the base 10, although it is foreseeable that the apertures 60 may be positioned elsewhere on the base 10 and/or that additional apertures 60 may be included in the base 10. For example, the at least one aperture 60 may be positioned at any location along a circumference 72 of the top portion 65 of the base 10. If more than one aperture 60 is provided in the top portion 65, the user may position the pot 5 in various configurations on the base 10. For example, the user may, as he or she is placing the pot 5 onto the base 10, decide to position and locate the spout 50 inside any of the at least one aperture 60.

Figure 2:
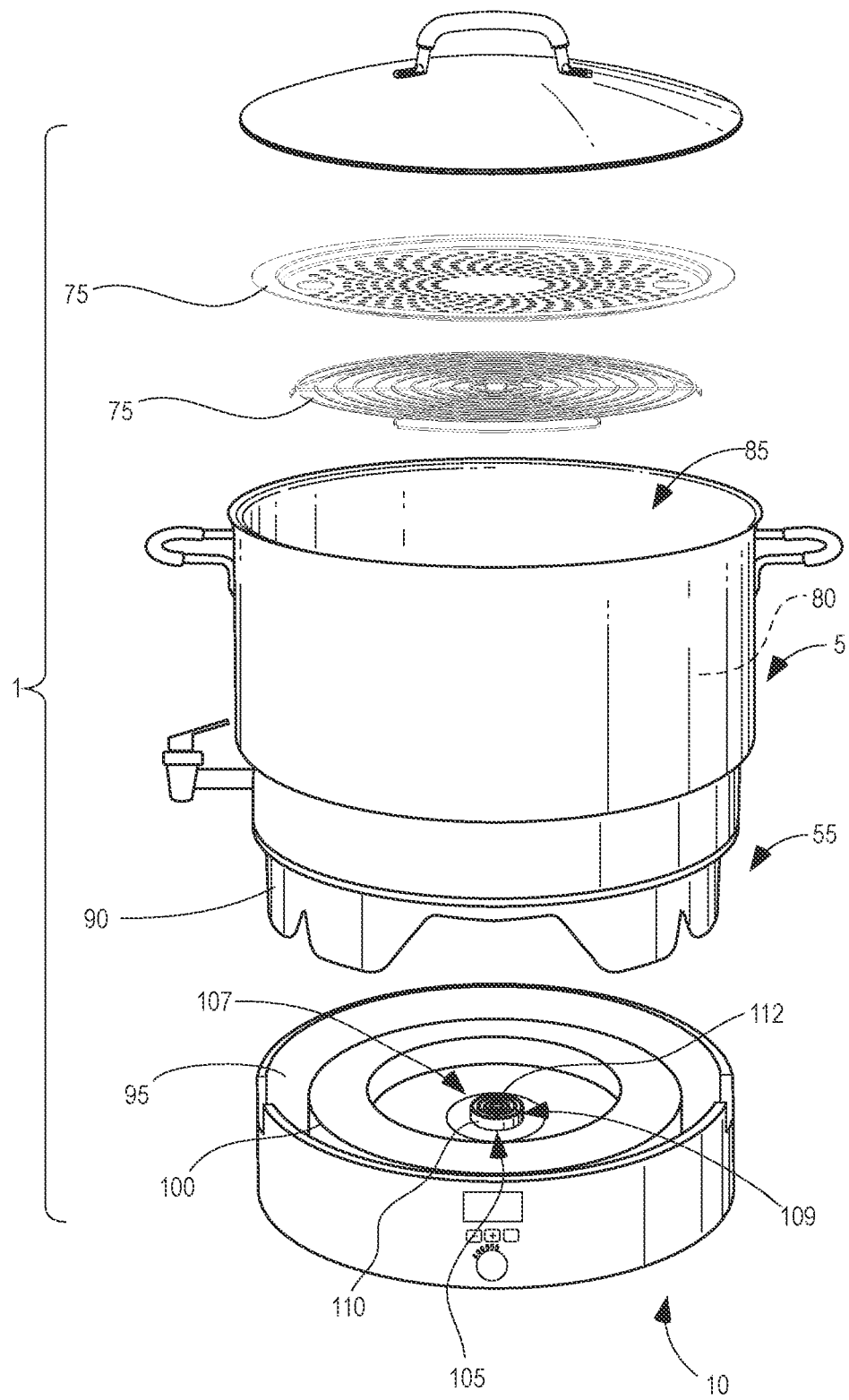
FIG. 2 is an exploded view of the electric canning device of FIG. 1.

Turning to FIG. 2, additional components of the canning device 1 are illustrated. The canning device 1 may include racks 75 that may be inserted into an interior 80 of the pot 5 via an opening 85. The racks 75 may be provided as jar trivets, steaming trays, or other forms appreciated by those skilled in the art. The racks 75 may be held in predetermined positions above a bottom interior surface (not illustrated) of the pot 5 via mechanisms known and appreciated by those skilled in the art. For example, the pot 5 may include protrusions (not illustrated) upon which the racks 75 may rest. As an additional example, the racks 75 may latch into a side surface (not illustrated) of the pot 5, or the racks 75 may couple to recesses embedded in the side surface of the pot 5.

The racks 75 may give the canning device additional functionality. For example, the racks 75 may allow the canning device 1 to act as a steamer. If the user wishes to steam food, the user may fill the pot with a predetermined amount of water, place the food directly onto the rack 75 without immersing the food, and position the lid 15 over the pot 5. After the canning device 1 is activated and the water therein boils, the steam created within the pot 5 may cook the food on the rack 75. In other instances, the racks 75 may hold the canning jars above the bottom interior surface of the pot 5 such that the heat applied to the pot 5 during the canning process is not directly applied to the jars. Other uses for the racks 75 will be appreciated by those skilled in the art.

The bottom portion 55 of the pot 5 may also include supports 90. The supports 90 may be positioned and located along an outer perimeter of the bottom portion 55 of the pot 5, although other locations for the supports 90 are foreseeable. The supports 90 may be constructed out of a durable, non-conductive material (e.g., plastic) and may protrude downwardly and away from the metallic portions of the body 20. During the canning process, the temperature of the supports 90 may remain relatively constant or increase less than the metallic portions of the pot 5. Thus, the supports 90 may help prevent the pot 5 from damaging a surface if the pot 5 is positioned upon the surface immediately or soon after the canning device 1 is used.

In addition, the supports 90 may be received into a channel 95 of the base 10. The channel 95 may be positioned such that an interior 100 of the base 10 substantially surrounds the supports 90 to provide the canning device 1 with additional stability when the pot 5 is placed on the base 10. The channel 95 may be provided as a recess that is positioned and located between the sidewall 67 and the interior 100 of the base 10. The supports 90 and the channel 95 may also help the user confirm a secure coupling between a first connector port 105 of the base 10 and a second connector port provided on the pot 5 (see FIG. 3). In some embodiments, the supports 90 may be secured within the channel 95 via a friction fit. In other embodiments, the supports 90 may abut the interior 100 of the base 10 and/or the walls of the channel 95.

The first connector port 105 may be positioned and located near a center 107 of the base 10, although other positions for the first connector port 105 are foreseeable. When the pot 5 is coupled to the base 10, the first connector port 105 may be configured to supply power (e.g., electricity) to the pot 5 from an external energy source (not illustrated) using known methods. The first connector port 105 may comprise a body 109 including projections 110 extending upwardly and away from the interior 100. The projections 110 may be provided as substantially hollow, cylindrical members, although other forms for the projections 110 are foreseeable. The projections 110 may be nested inside each other such that an outermost projection 110 (with the largest diameter) substantially surrounds the other projections 110 and such that an innermost projection 110 (with the smallest diameter) is substantially surrounded by the other projections 110. Electrical contacts (not illustrated) that can supply power to the pot 5 via known methods may be positioned and located in gaps provided between the projections 110.

The body 109 of the first connector port 105 may also include a bore 112. The bore 112 may help couple the first connector port 105 to the corresponding second connector port provided on the pot 5 (see FIG. 3) when the pot 5 is coupled to the base 10. The bore 112 may be substantially surrounded by the projections 110, or the bore 112 may otherwise be provided in the body 109 as would be appreciated by those skilled in the art.

Figure 3:
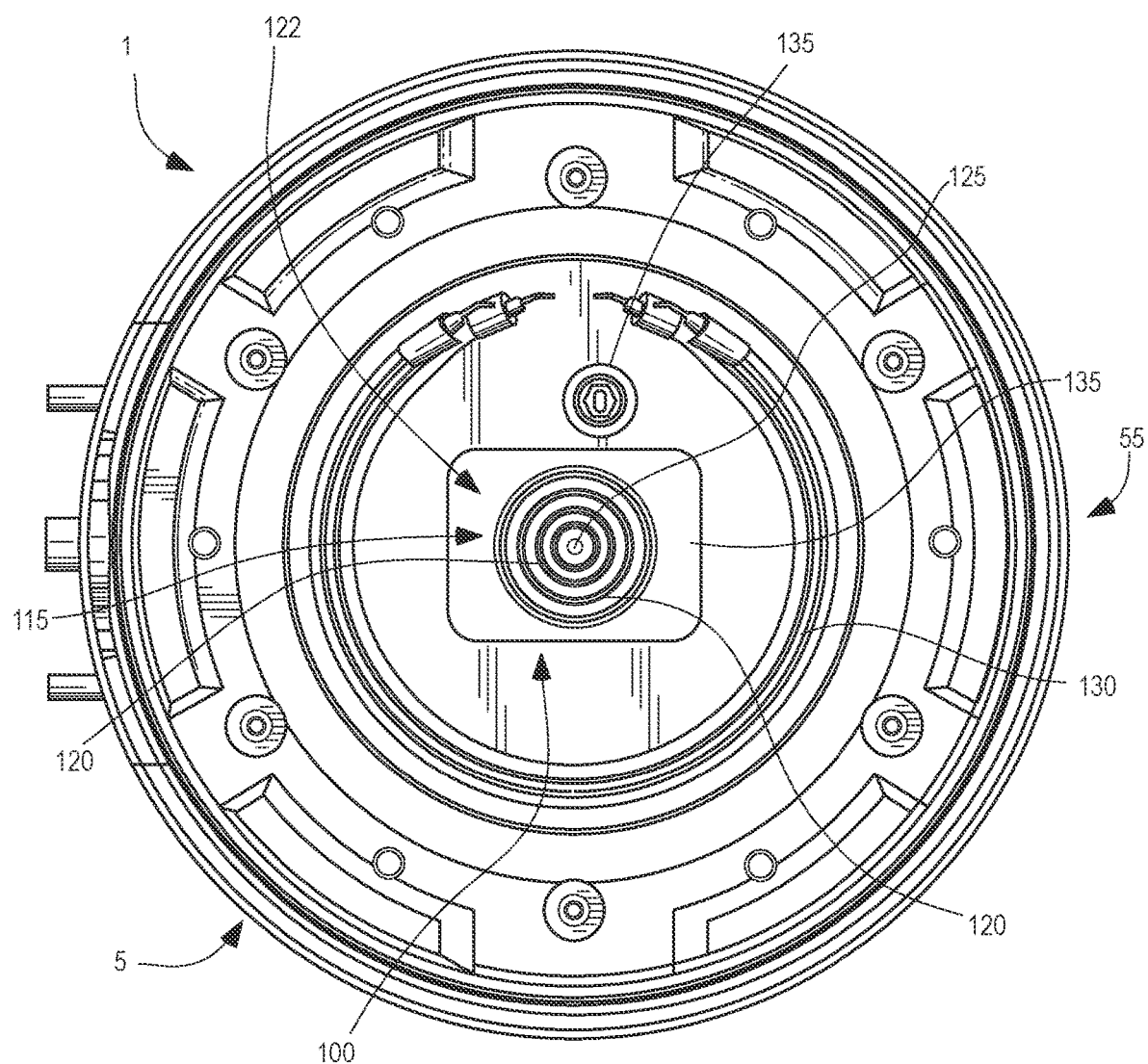
FIG. 3 is a bottom plan view of the pot of FIG. 1.

FIG. 3 further illustrates the bottom portion 55 of the pot 5. The pot 5 may include a second connector port 115 configured to interface with and/or be received by the first connector port 105 of the base 10 (see FIG. 2). The second connector port 115 may include connectors 120 protruding outwardly and away from a center section 122 of the bottom portion 55, although other locations for the connectors 120 are foreseeable. The connectors 120 may be composed of a metallic, conductive material and may be configured to conduct power (e.g., electricity) from the base 10 to electrical components of the pot 5 via known methods. The connectors 120 may be provided as thin and hollow cylindrical members that are configured to be received between the projections 110 of the first connector port 105, although other forms for the connectors 120 (e.g., substantially linear pins) are foreseeable. When the projections 110 and the connectors 120 are provided as substantially cylindrical or circular components, an electrical connection between the pot 5 and the base 10 may be maintained when the pot 5 is rotated in a clockwise direction or a counterclockwise direction relative to the base 10. For example, an electrical connection between the pot 5 and the base 10 may be maintained when the pot 5 is rotated 180 degrees clockwise or counterclockwise from its orientation illustrated in FIG. 1.

Referring again to FIG. 3, the connectors 120 may substantially or completely surround a projection 125, although other positions for the projection 125 are foreseeable. The projection 125 may be a metallic or non-metallic component configured to interface with and/or be received by the bore 112 of the first connector port 105. As such, the projection 125 may help a user guide the second connector port 115 into the first connector port 105, which may help the user establish the electrical connection between the base 10 and the pot 5.

The bottom portion 55 may include or be coupled to at least one heating element 130. While two heating elements 130 are illustrated in FIG. 3, alternative embodiments of the pot 5 may include a single heating element 130 or more than two heating elements 130. The heating element 130 may be a resistive wire-shaped element composed of a high resistance material (e.g., copper, nichrome), although other types of heating elements are foreseeable. The heating element 130 may be provided in the form of a tube, a coil, or another shape that would be appreciated by those skilled in the art. The heating element 130 may be positioned and located around the center section 122 of the bottom portion 55 of the pot 5, although the heating element 130 may also be positioned and located elsewhere on the bottom portion 55. The heating element 130 may abut the bottom portion 55 or there may be a small air gap between the heating element 130 and the bottom portion 55. When the heating element 130 is activated, electricity may flow through the heating element 130. This may cause the temperature of the heating element 130 to increase due to its internal resistive properties. As the temperature of the heating element 130 increases, a portion of its heat energy may be transferred via conduction, convection, and/or radiation to the bottom portion 55 of the pot 5. As the bottom portion 55 (and thus the pot 5) warms, the heat energy is then transferred to the contents of the pot 5, facilitating the canning process.

A temperature sensor 135 may be provided with or coupled to the bottom portion 55 of the pot 5. The temperature sensor 135 may be provided as a thermocouple, a resistance temperature detector, a thermistor, a semiconductor-based integrated circuit, or any other analog or digital temperature sensor known in the art. The temperature sensor 135 may be coupled to a surface of the bottom portion 55 and/or the temperature sensor 135 may extend through the bottom portion 55 such that a portion of the temperature sensor 135 contacts the water bath within the interior 80 (see FIG. 2) of the pot 5. The temperature sensor 135 may be configured to measure a temperature of the water bath retained within the pot 5, the bottom portion 55, and/or other components of the canning device 1, as would be appreciated by those skilled in the art. Furthermore, the temperature sensor 135 may be positioned and located elsewhere on the canning device 1, and the canning device 1 may be provided with more than one temperature sensor 135.

Figure 4:
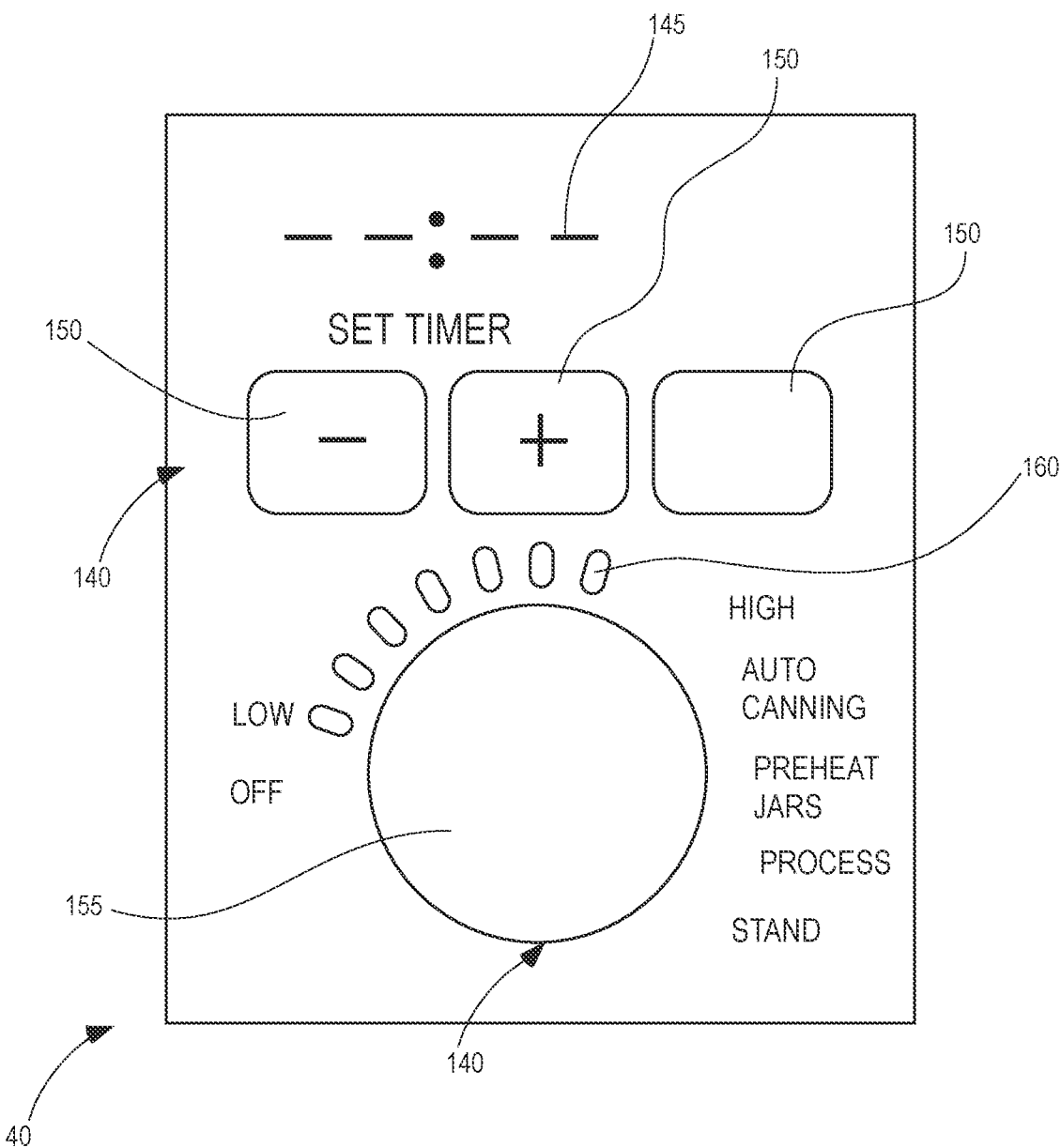
FIG. 4 is a plan view of one embodiment of an interface of an electric canning device.

Turning to FIG. 4, an embodiment of the interface 40 is illustrated. The interface 40 may allow the user, via at least one input device 140, to control aspects of the canning process as provided by the canning device 1 (the canning device 1 and its various components are not illustrated). For example, via the at least one input device 140, the user may control the amount of heat applied to the pot 5 via the heating element 130, the water bath temperature, the amount of time that the heating element 130 is activated, and/or other features of the canning device 1. In some embodiments, the interface 40 may also include one or more output devices 145. The one or more output devices 145 may include mechanical clocks or timers, LED displays, speakers, LED lights, and other communication devices that would be appreciated by those skilled in the art. In the illustrated embodiment, the one or more output devices 145 is provided in the form of an LED screen that may communicate information to the user.

The at least one input device 140 provided on the interface 40 may be mechanical, digital, or combinations thereof, as would be appreciated by those skilled in the art. For example, the interface 40 may include a first input 150 that may allow the user to select the amount of time that the canning device 1 is activated and a second input 155 that may allow the user to choose from the different modes of operation of the canning device 1. The first input 150 may be provided as a capacitive touch screen that responds to the user's touch, while the second input 155 may be a physical knob that the user may turn. In alternative embodiments of the invention, both the first and second inputs 150, 155 may be provided as capacitive touchscreens, physical knobs, push buttons, mechanical switches, and/or other devices as would be appreciated by those skilled in the art.

The interface 40 may include text primers to assist the user in selecting amongst the various modes of operation (including automatic canning operations) of the canning device 1. The user may use the at least one input device 140 in conjunction with the text primers to select from these various modes. For example, the interface 40 may include the words "low" and "high" to help guide the user in choosing the amount of heat to apply to the water bath. For example, the "low" setting may represent a first water bath target temperature of less than about 150° F. and the "high" setting may represent a second water bath target temperature about equal to the boiling point of the water (in some cases, adjusted for altitude). In addition, the interface 40 may include markings 160 between the words "low" and high" to represent gradations between the temperature options provided by the low and high settings. For example, the low setting may set the canning device 1 to a temperature target of 142° F., the high setting may set the canning device 1 to a temperature target of 212° F., and the markings between low and high may gradate the temperature between the 142° F. and 212° F. in equal or unequal intervals. In some embodiments, the interface 40 may include other textual primers such as "medium-low," "medium," and "medium-high" to assist the user in selecting the amount of heat that will be applied to the contents of the canning device 1 during the canning process.

Advantageously, the canning device 1 may also include various "auto canning" options selectable by the user via the textual primers. The auto canning options may be preprogrammed into the memory of the canning device 1 by the manufacturer via known methods. The auto canning options may cause the canning device 1 to function in predetermined ways. For example, the auto canning options included in the programming of the canning device 1 may include a "preheat jars" option, a "process" option, and a "stand" option. Each option may heat the contents of the pot 5 (i.e., the water bath) to a predetermined temperature for a predetermined length of time and/or may turn off the heating element 130 after a predetermined amount of time. For example, the "preheat jars" option may heat the water bath of the pot 5 to a temperature of 180° F., the "process" option may heat the water bath until it is at a rolling boil and then provide a constant amount of heat for a predetermined amount of time thereafter, and the "stand" option may turn off the heating element 130 after processing is complete. As an additional example, the "preheat jars" option may heat the water bath of the pot 5 to a temperature less than the boiling point of the water, the "process" option may heat the water bath until the water bath is boiling and/or apply heat to the water bath for a predetermined amount of time, and the "stand" option may provide no heat and/or substantially less heat to the water bath than the heat provided in the preheat and process options. Additional configurations for the options set forth above would be appreciated by those having skill in the art.

In some embodiments of the invention, the auto canning option will move through each processing option or step without any substantial user intervention. In alternative embodiments of the invention, the auto canning process may be only partially automated. For example, the canning device 1 may, via the one or more output devices 145, inform the user when a particular stage of the auto canning process is complete and require the user to select, via the at least one input device 140, the next stage of the auto canning process the user wishes to carry out.

The at least one sensor (not illustrated) provided with the canning device 1 may include the temperature sensor 135 whose measurements may be integrated into the decisionmaking process of the canning device 1. For example, the predetermined amounts of time described above for the auto canning steps may not begin until the temperature of the water bath meets or exceeds a predetermined temperature threshold as measured by the temperature sensor 135. The temperature sensor 135 may be configured to measure the temperature of the water bath, and communicate said temperature to the interface 40 or a controller in communication with the at least one sensor, using methods known and understood in the art.

As previously described with reference to FIG. 1, the water bath temperature targets of the canning device 1 may be adjusted based on the altitude measurements of the altitude sensor. The canning device 1 may, via known methods, adjust the temperature associated with boiling based on the altitude of the canning device 1. For example, the canning device 1 may adjust the target temperature of boiling water lower when the canning device 1 is at a high altitude.

When the canning device 1 is in use, the interface 40 may communicate the time remaining in the auto canning process. In other embodiments, the interface 40 may communicate the amount of time remaining in each step of the auto canning process (e.g., the preheat, process, and stand options). In further embodiments, the one or more output devices 145 may display or provide information related to the water bath temperature. For example, if the one or more output devices 145 is provided as a speaker, a chime may sound when a step of the canning process is complete. In yet other embodiments, the user may select the type of information to be displayed on or communicated by the interface 40, as would be appreciated by those skilled in the art.

In some embodiments of the invention, the user may use the at least one input device 140 to set a timer on the interface 40. The timer may be configured to automatically turn off the canning device 1 after a time input by the user has elapsed, to inform the user that the time period has elapsed via the one or more output devices 145, or a combination of the preceding.

The at least one input device 140 and the one or more output devices 145 that may be integrated into the canning device 1 are not limited in number nor type. Further, the devices 140, 145 are not restricted to being positioned and located on the interface 40. The devices 140, 145 may be positioned and located elsewhere on the canning device 1 as would be appreciated by those skilled in the art.

In some embodiments, the canning device 1 may include a controller (not illustrated) designed to control the automatic processes associated with the canning device 1. The canning device 1 may communicate with the controller through a wired and/or a wireless connection. The controller may be in electrical communication with, by way of example, the interface 40, the display 45, the at least one input device 140, and/or the one or more output devices 145. The controller may be provided in the form of a processor and a memory. The memory may include software and data, and the memory may be designed for storage and retrieval of information to be processed by the processor. The processor includes an input configured to receive process signals (e.g., signals from the interface 40, at least one input device 140, and/or the at least one sensor). The controller may operate autonomously or semi-autonomously, may read executable software instructions from the memory or a computer-readable medium (e.g., a hard drive, a CD-ROM, flash memory), and/or may receive instructions via the input from the user or another source logically connected to a computer or device, such as another networked computer or server. For example, the server may be used to control the canning device 1 or the via the controller on-site or remotely.

The processor may process the process signals provided as the input to generate an output. The output may take the form of a process control action. Example process control actions may include sending a signal to the interface 40, the display 45, the one or more output devices 145, and/or any other automatically controllable components of the canning device 1. Other example process control actions may include adjusting the amount of heat applied to the pot 5 via the heating element 130, adjusting a target temperature for the water bath, adjusting the operational time of the canning device 1 in its various modes, and computing an elapsed time that the canning device 1 has been in use, and the like.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. A canning device comprising:
   a pot including a body and a spout, the spout fluidly coupled to the body;
   a base including:
      at least one sidewall extending between a top portion and a bottom portion of the base;
      at least one aperture extending through the at least one sidewall; and
      an interface including at least one input device and at least one output device; and
   wherein modes of operation for the canning device are selectable via the interface.

2. The canning device of claim 1, wherein the least one aperture extends from the top portion of the base and at least partially towards the bottom portion of the base, and wherein the at least one aperture is configured to receive the spout of the pot.

3. The canning device of claim 1, the canning device further including at least one sensor designed to sense at least one parameter associated with the canning device.

4. The canning device of claim 3, wherein the at least one sensor provided is at least one of a temperature sensor and an altitude sensor.

5. The canning device of claim 3, the canning device further including a controller configured to adjust the at least one parameter based on an input obtained from the at least one sensor.

6. The canning device of claim 1, the canning device further including:
   an altitude sensor;
   a controller in communication with the altitude sensor; and
   wherein the controller adjusts a target water temperature at least partially based on data provided to the controller by the altitude sensor.

7. A canning device comprising:
- a pot including a body and a spout, the spout coupled to a bottom portion of the body and extending outwardly substantially in a horizontal direction away from the body of the pot;
- a base including a sidewall extending upwardly and in a substantially vertical direction, at least one aperture extending in the horizontal direction through the sidewall and at least partially in a vertical direction through the sidewall; and
- wherein, when the pot is received into the base, the body of the pot is substantially surrounded by the sidewall when the pot is received into the base, and the spout is configured to extend through the at least one aperture.

8. The canning device of claim 7, the canning device further including at least one sensor designed to measure at least one parameter, and wherein the at least one parameter includes at least one of a temperature of a water bath, an altitude of the canning device, and an elapsed time.

9. The canning device of claim 7, the base further including an interface having at least one input device and at least one output device.

10. The canning device of claim 9, the canning device further including a controller in communication with the at least one input device and the at least one output device, and wherein the at least one output device is controlled by the controller at least partially based upon an input received from the at least one input device.

11. The canning device of claim 7, the canning device further including a controller, the controller including a processor designed to execute software associated with at least one automatic canning process.

12. The canning device of claim 11, wherein the base includes at least one input device via which a first input can be supplied to the controller, and wherein, when the first input is received by the controller, the controller executes the software associated with a first automatic canning process of the at least one automatic canning process.

13. The canning device of claim 11, wherein the canning device is configured to automatically turn off after the at least one automatic canning process is complete.

14. The canning device of claim 7, the canning device further including:
- at least one input device, the at least one input device selected from the group consisting of an interface, a display, at least one sensor, and combinations thereof;
- a controller is designed to receive at least one input from the at least one input device and generate at least one output; and
- wherein the at least one output includes at least one of a water bath temperature, an amount of heat applied to the pot by the canning device, an amount of time, and a sound emitted by a speaker.

15. A canning device comprising:
- a pot configured to couple to a base, the base including an interface having at least one input device and at least one output device; and
- a controller in electrical communication with the at least one input device and the at least one output device, the controller including programming configured to execute one or more automatic canning options.

16. The canning device of claim 15, wherein the one or more automatic canning options further include a preheat option, a process option, and a stand option.

17. The canning device of claim 15, wherein an interior of the pot is selectively couplable to a rack, and wherein the rack is configured to be positioned above a bottom interior surface of the pot when received in the pot.

18. The canning device of claim 15, wherein the base is in electrical communication with a power source, and the pot is in electrical communication with the power source via the base.

19. The canning device of claim 15, the pot further including a heating element positioned and located adjacent to a bottom exterior surface of the pot.

20. The canning device of claim 19, wherein the controller controls a heat output of the heating element at least partially based upon an input received from the at least one input device.

* * * * *